United States Patent
Baldwin et al.

(10) Patent No.: US 7,467,564 B2
(45) Date of Patent: Dec. 23, 2008

(54) ACTUATOR MECHANISM FOR SHIFT MOTORS OF A TRANSMISSION

(75) Inventors: Reid Baldwin, Howell, MI (US); David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 11/399,996

(22) Filed: Apr. 7, 2006

(65) Prior Publication Data

US 2007/0209461 A1    Sep. 13, 2007

Related U.S. Application Data

(63) Continuation-in-part of application No. 11/374,354, filed on Mar. 13, 2006.

(51) Int. Cl.
*F16H 59/00* (2006.01)
*F16H 61/00* (2006.01)
*F16H 63/00* (2006.01)

(52) U.S. Cl. .......................... 74/337.5; 74/329; 74/330; 74/331; 74/335; 74/340; 74/358; 74/360; 192/48.4; 192/48.9; 192/93 B

(58) Field of Classification Search ................ 74/337.5, 74/325, 329, 330, 331, 335, 339, 340, 355, 74/358, 360; 192/48.4, 48.8, 48.9, 93 R, 192/93 B
See application file for complete search history.

(56) References Cited

U.S. PATENT DOCUMENTS

| 2,474,104 | A  | * | 6/1949  | Groene et al. ................. 74/640 |
| 5,239,894 | A  | * | 8/1993  | Oikawa et al. .............. 477/107 |
| 5,724,856 | A  | * | 3/1998  | Back ........................... 74/335 |
| 6,220,109 | B1 | * | 4/2001  | Fischer et al. .............. 74/337.5 |
| 6,286,381 | B1 | * | 9/2001  | Reed et al. ................ 74/336 R |
| 6,725,737 | B2 | * | 4/2004  | Baasch et al. ............ 74/473.12 |
| 7,305,900 | B2 | * | 12/2007 | Suzuki et al. ................. 74/340 |
| 2003/0019312 | A1 |  | 1/2003  | Gumpoltsberger et al. |

FOREIGN PATENT DOCUMENTS

| DE | 19920440 | 11/2000 |
| GB |   791662 |  3/1958 |

\* cited by examiner

*Primary Examiner*—David D. Le
(74) *Attorney, Agent, or Firm*—David B. Kelley; MacMillan, Sobanski & Todd, LLC

(57) ABSTRACT

A system for actuating gear changes in a motor vehicle transmission includes an electric motor including a motor shaft supported for rotation about an axis, first and second actuator drums supported for rotation substantially parallel to the axis, and a drive mechanism including a first power path driveably connecting the motor shaft and the first drum, and a second power path driveably connecting the motor shaft and the second drum.

13 Claims, 6 Drawing Sheets

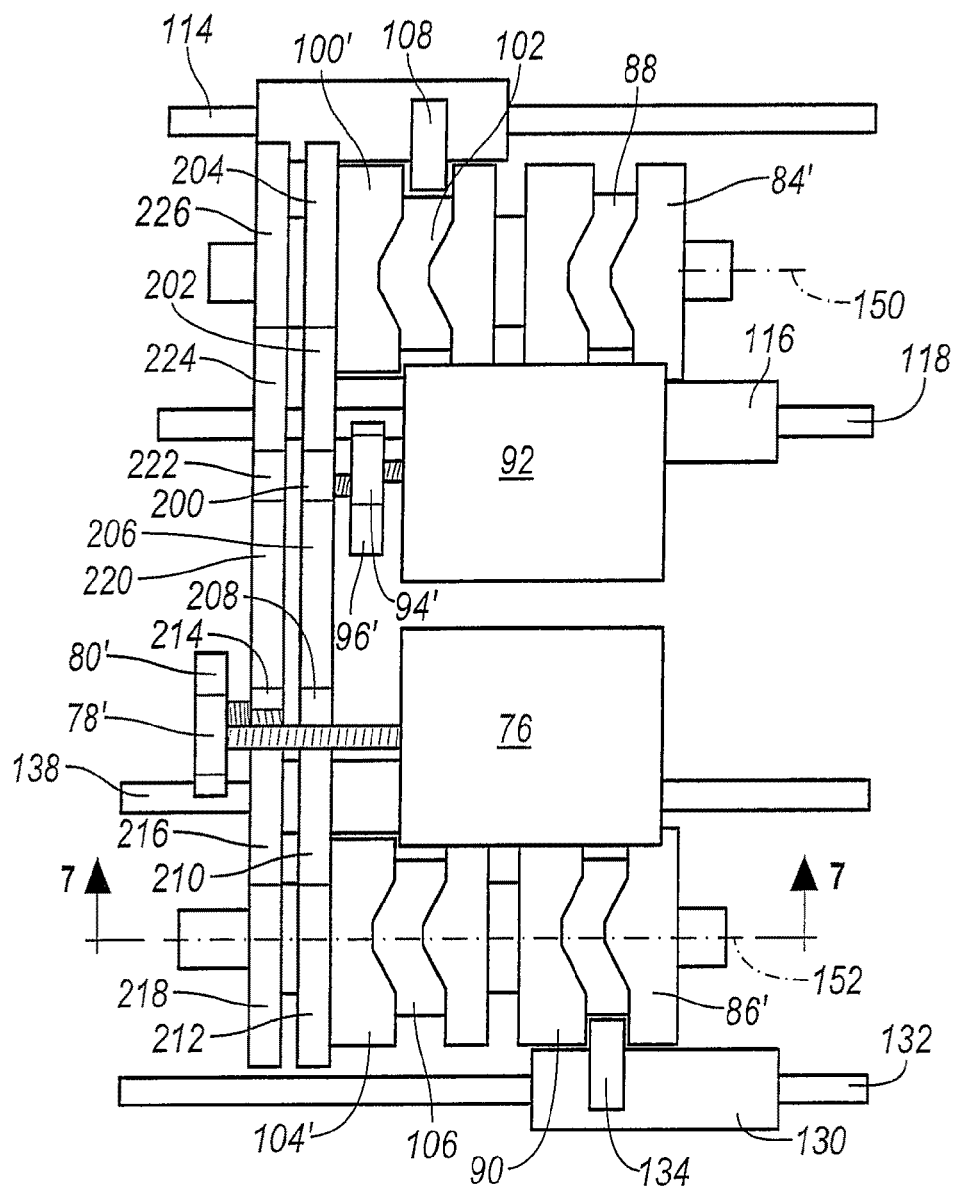
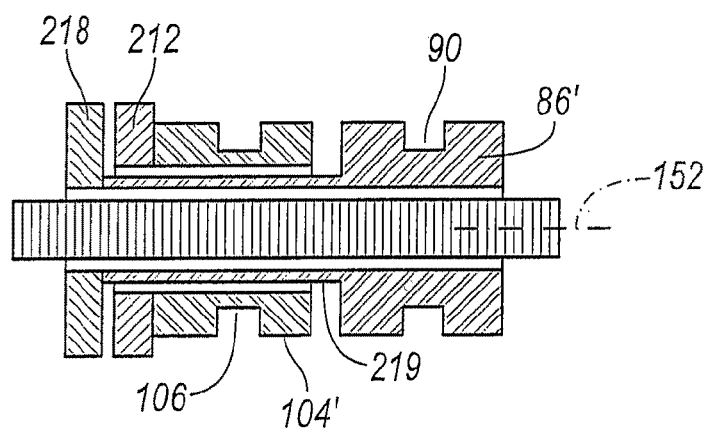
FIG. 8
FIG. 7

ACTUATOR MECHANISM FOR SHIFT MOTORS OF A TRANSMISSION

CROSS-REFERENCE TO RELATED APPLICATION

This application is a continuation-in-part of the co-pending U.S. patent application Ser. No. 11/374,354, filed Mar. 13, 2006.

BACKGROUND OF THE INVENTION

The preferred embodiment relates generally to an apparatus for actuating couplers that engage gears in a transmission.

A twin clutch transmission must have some mechanism to move shift forks to engage gears. Shift drums convert rotary motion of a drum into appropriate linear motion of a set of shift forks. For optimal shift flexibility, it is best to have separate control of the engagement of the odd-numbered gears and the even-numbered gears. However, it is also advantageous to locate the shift drum physically close to the shift forks. Unfortunately, odd and even gears tend to be located at opposite ends of the gearbox, with both odd and even gears along each side. For example, the first, second and sixth gears may be located on one side of the gearbox, and the third, fourth, and fifth, and reverse gears are located on the opposite side.

It is feasible to use one electric motor to engage and disengage gears one, two and six and to use another electric motor to engage and disengage gears three, four, five and reverse. But complex mechanisms are required in order to enable three gear step shifts, i.e., six-three, five-two downshifts, with that arrangement. These complex mechanisms introduce potential failure modes. Also, these arrangements require an additional interlock mechanism to preclude simultaneous engagement of multiple odd gears or multiple even gears.

SUMMARY OF THE INVENTION

One embodiment uses four actuator drums instead of two: One drum for odd gears on a first side of the gearbox, another drum for even gears on the first side, a third drum for odd gears on a second side, and a fourth drum for even gears on the second side. The actuator drums on each side can be co-axial and located close to the shift forks they control. One motor drives the actuator drums that control the odd gears; another motor drives the drums that control the even gears. The motors are connected to the drums through gearing such that the odd drums rotate in unison and the even drums rotate in unison.

The gearing can be accomplished in multiple ways. In one embodiment, drums are driven by one of the motors through spur gears or spiral gears. In order to move all of the gearing to one side of the drums for packaging considerations, one of the drums is supported on the other drum on each side.

An advantage resulting from a preferred embodiment relative to previous odd/even drum solutions is that the actuator drums can be located close to the shift forks, thereby minimizing the length of the fork mechanism. The preferred embodiment can be packaged in a compact space in the transmission case.

One electric motor is used to control engagement of the second, fourth, and sixth and reverse gears; another electric motor controls engagement of the first, third and fifth gears. This arrangement provides optimal shift flexibility and allows separate control of the engagement and disengagement of odd and even gears.

In one embodiment, a system for actuating couplers that produce gear changes in a motor vehicle transmission includes an electric motor having a motor shaft supported for rotation about an axis, first and second actuator drums supported for rotation substantially parallel to the axis, and a drive mechanism including a first power path driveably connecting the motor shaft and the first drum, and a second power path driveably connecting the motor shaft and the second drum. The drums actuate couplers, each coupler alternately engaging and disengaging a drive connection in the transmission.

In another embodiment, the system includes a first electric motor having a first motor shaft supported for rotation about a first axis, first and second actuator drums supported for rotation substantially parallel to the first axis, a first drive mechanism including a first power path driveably connecting the first motor shaft and the first drum, and a second power path driveably connecting the first motor shaft and the second drum, and aligned in a first plane with the first power path. A second electric motor includes a second motor shaft supported for rotation. Third and fourth actuator drums are supported for rotation substantially parallel to the first axis. A second drive mechanism includes a third power path driveably connected to the second motor shaft and the third drum, and a fourth power path driveably connected to the second motor and the fourth drum, and aligned in a second plane with the third power path.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of the embodiments when considered in the light of the accompanying drawings in which:

FIG. 7 is across section taken at plane 7-7 of FIG. 8;

FIG. 8 is a schematic diagram of a top view of an alternate actuation system;

DESCRIPTION OF THE PREFERRED EMBODIMENT

Figure 1:
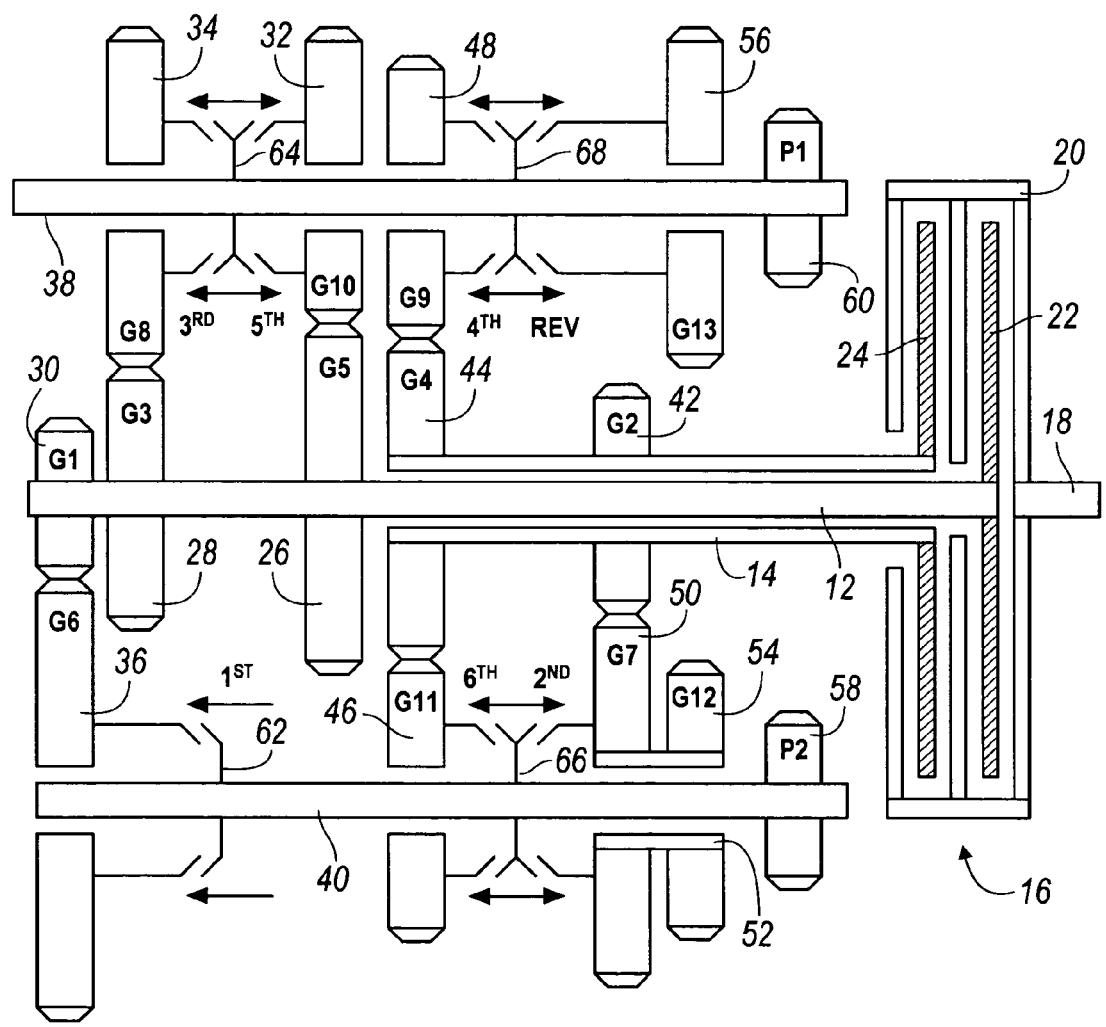
FIG. 1 is a schematic diagram of a twin clutch automatic transmission to which the actuator system can be applied.

Referring now to FIG. 1, a transmission 10 includes a first input shaft 12, and a second input shaft 14. Input shaft 14 is a sleeve shaft surrounding input shaft 12. A dual clutch mechanism 16 produces a drive connection between the crankshaft 18 of an engine, an electric motor shaft, or the shaft of another power source to the first and second input shafts 12, 14. The clutch mechanism 16 includes a rotor 20, which is driveably connected to shaft 18 and is alternately driveably connected to and disconnected from input shaft 12 when clutch 22 is engaged and disengaged, respectively. Rotor 20 is alternately driveably connected to and disconnected from input shaft 14 when clutch 24 is engaged and disengaged, respectively.

Input shaft 12 supports pinions 26, 28, 30, which are secured to shaft 12. Each pinion 26, 28, 30 is in meshing engagement with a corresponding gear 32, 34, 36, gears 32, 34 being journalled on a layshaft 38, gear 36 being journalled on a layshaft 40. Similarly, the second input shaft 14 supports pinions 42, 44. Pinion 44 is in meshing engagement with a gear 46, journalled on a layshaft 40, and a gear 48, journalled on layshaft 38. Pinion 42 is in meshing engagement with a gear 50. Gear 50 is secured to a stub shaft 52, which is journalled on layshaft 40. Gear 54, also secured to stub shaft 52, is in meshing engagement with a gear 56, which is journalled on layshaft 38.

A final drive pinion 60, secured to layshaft 38, and a final drive pinion 58, secured to layshaft 40, are in continual meshing engagement with a final drive ring gear 61 (seen best in FIG. 3), which transmits power to the axles of the driven wheels of the vehicle.

A coupler 62, which may be a synchronizer, alternately driveably engages or connects the first speed gear 36 with layshaft 40 when the sleeve of coupler 62 is displaced leftward from the neutral position shown in FIG. 1 to an engaged state, and disconnects gear 36 from layshaft 40 when that sleeve is in a neutral state, wherein no gear is engaged by coupler 62.

A coupler 64 alternately connects and disconnects the third speed gear 34 and the fifth speed gear 32 with layshaft 38 depending on the axial position or state of the selector sleeve of coupler 64. FIG. 1 shows coupler 64 in the neutral state. When the sleeve of coupler 64 is moved leftward to a drive state, coupler 64 causes gear 34 to become driveably engaged with layshaft 38. When the sleeve of coupler 64 is moved rightward to a drive state, coupler 64 causes gear 32 to become driveably engaged with layshaft 38.

Similarly, coupler 66 alternately connects and disconnects the sixth speed gear 46 and the second speed gear 50 with layshaft 40 depending on the axial position of the selector sleeve of coupler 66. FIG. 1 shows coupler 66 in the neutral state. When the sleeve of coupler 66 is moved leftward to a drive state, coupler 66 causes gear 46 to become driveably engaged with layshaft 40. When the sleeve of coupler 66 is moved rightward to a drive state, coupler 66 causes gear 50, stub shaft 52 and reverse gear 54 to become driveably engaged with layshaft 40.

A coupler 68 alternately connects and disconnects the fourth speed gear 48 and the reverse output gear 56 with layshaft 38 depending on the axial position or state of the selector sleeve of coupler 68. FIG. 1 shows coupler 68 in the neutral state. When the sleeve of coupler 68 is moved leftward to a drive state, coupler 68 causes gear 48 to become driveably engaged with layshaft 38. When the sleeve of coupler 68 is moved rightward to a drive state, coupler 68 causes gear 56 to become driveably engaged with layshaft 38.

The transmission is controlled such that it produces a current or active gear upon engaging one of the input clutches 22, 24 after the selector sleeve of the corresponding coupler has been moved to a state that produces a drive connection between a current gear and the layshaft on which the coupler is supported. In addition, the transmission is controlled to produce a preselected gear, which is produced by changing the position of the selector sleeve of the corresponding coupler to produce a drive connection between the layshaft on which the respective coupler is supported. The preselected gear becomes the current gear upon engaging the clutch 22, 24 associated with the preselected gear and disengaging the clutch 22, 24 associated with the previous current gear.

Figure 2:
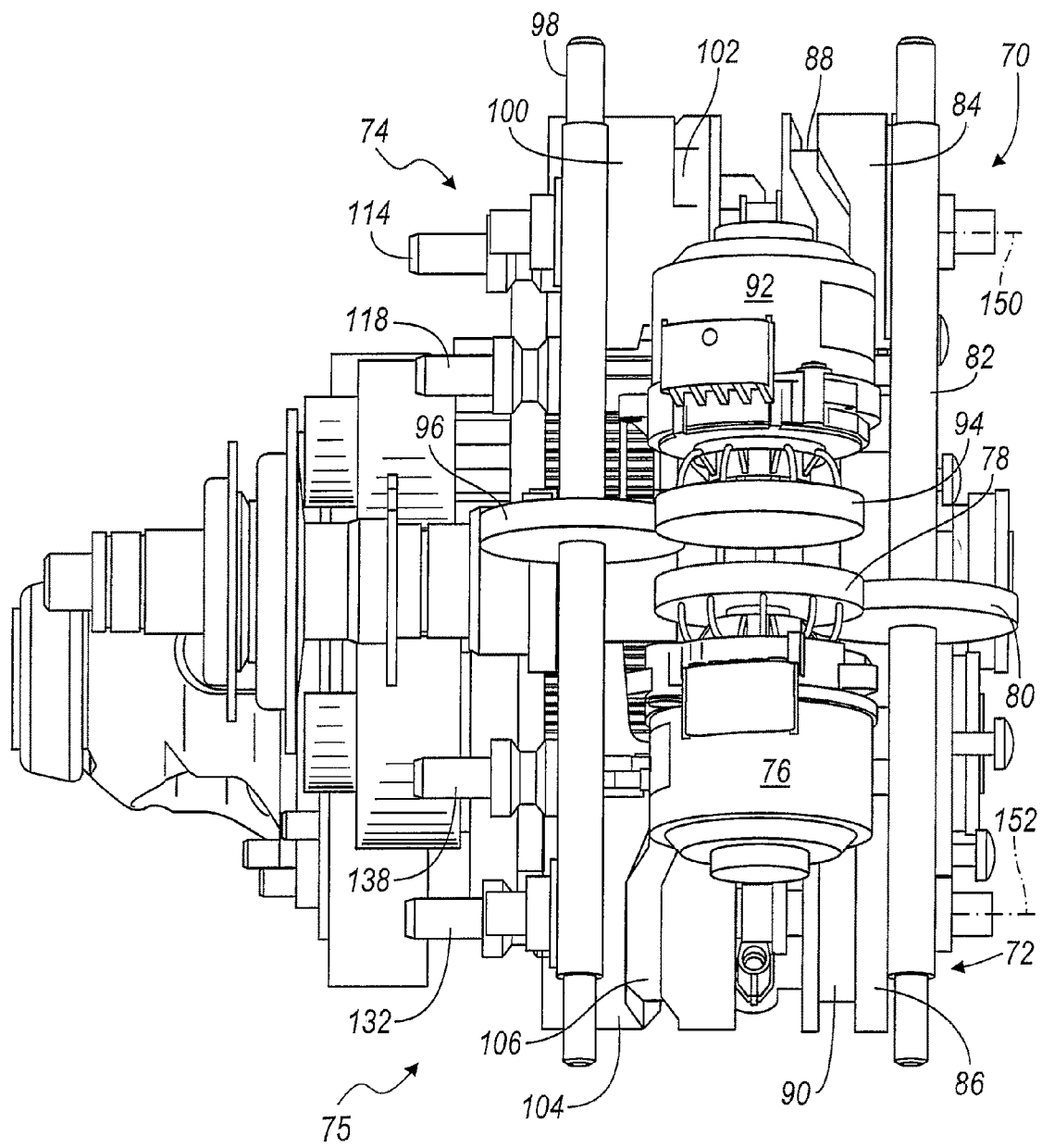
FIG. 2 is an isometric top view of an actuation system.

The couplers 62, 64, 66, 68 are preferably synchronizers, but they may be dog clutches, or a combination or synchronizers and dog clutches. Referring now to FIG. 2, the selector sleeve of coupler 62 is actuated for displacement leftward and rightward by an electro-mechanical actuator 70; the selector sleeve of coupler 64 is actuated for displacement leftward and rightward by an electro-magnetic actuator 72; the selector sleeve of coupler 66 is actuated for displacement leftward and rightward an electro-magnetic actuator 75; and the selector sleeve of coupler 68 is actuated for displacement leftward and rightward by an electro-magnetic actuator 76.

Electro-mechanical actuator 70 includes the electric motor 76; pinion 78 secured to the motor shaft; a gear 80 meshing with pinion 78; a worm gear 82 To which gear 80 is secured; and an actuating drum 84, driveably engaged with worm gear 82. Drum 84 is formed with a cam channel 88 that extends around the periphery of the drum and, in which a follower is located and guided for displacement leftward and rightward as drum 84 rotates.

Electro-mechanical actuator 72 includes the electric motor 76; pinion 78; gear 80; worm gear 82; and an actuating drum 86, driveably engaged with worm gear 82. Drum 86 is formed with a cam channel 90 that extends around the periphery of the drum and, in which a follower is located and guided for displacement leftward and rightward as drum 88 rotates.

Electro-mechanical actuator 74 includes an electric motor 92; a pinion 94 secured to the motor shaft; a gear 96 meshing with pinion 94; a worm gear 98, to which gear 96 is secured; and an actuating drum 100, driveably engaged with worm gear 98. Drum 100 is formed with a cam channel 102 that extends around the periphery of the drum and in which a follower is located and guided for displacement leftward and rightward as drum 100 rotates.

Electro-mechanical actuator 76 includes the electric motor 92, pinion 94, gear 96, worm gear 98, and an actuating drum 104, driveably engaged with worm gear 98. Drum 104 is formed with a cam channel 106 that extends around the periphery of the drum and in which a follower is located and guided for displacement leftward and rightward as drum 104 rotates.

Figure 3:
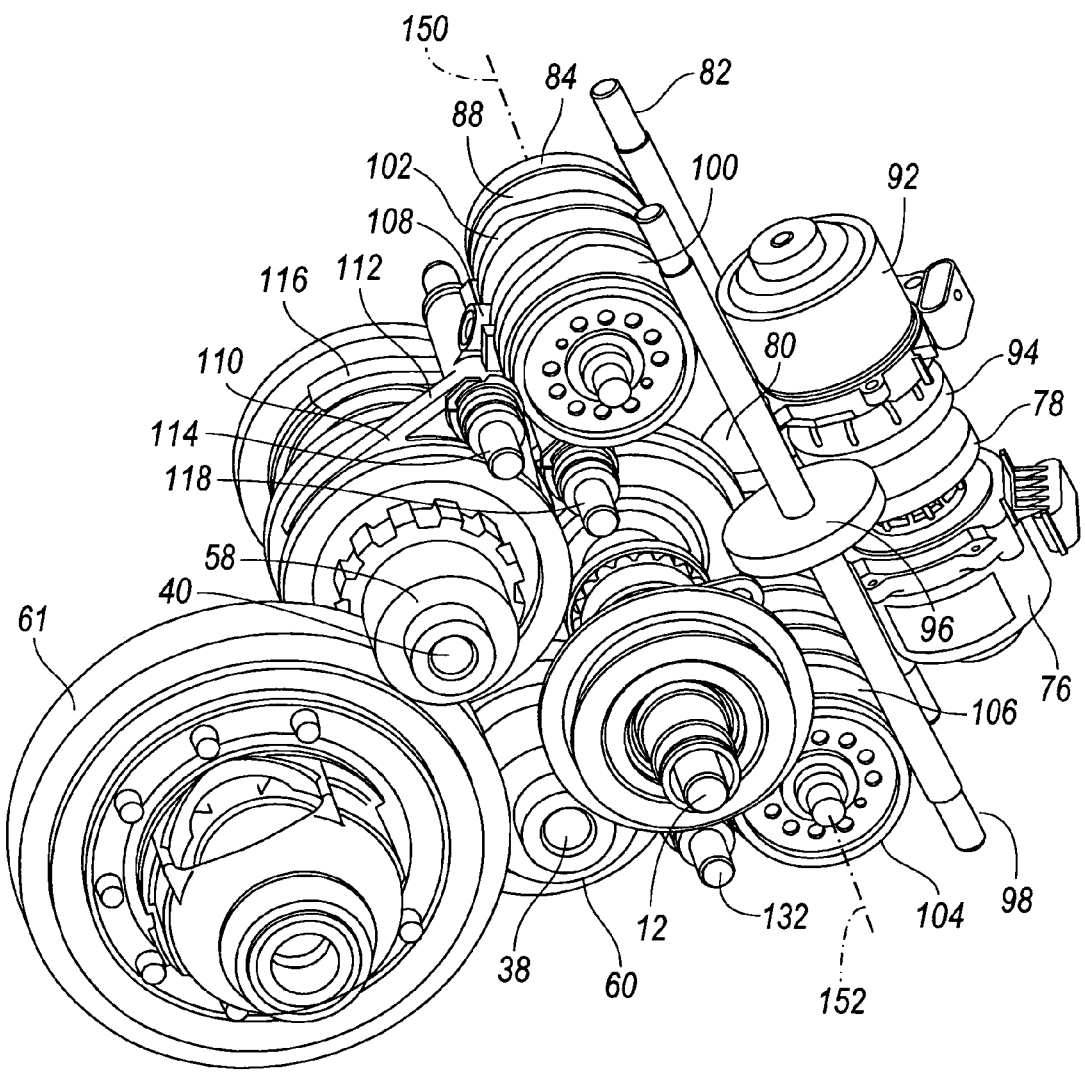
FIG. 3 is an isometric end view of the actuation system.

FIG. 3 illustrates a follower 108 located in cam channel 102 of actuator drum 100, contacting the lateral surfaces of the channel, and guided by the channel for displacement leftward and rightward as drum 100 rotates. A shift fork 110 is secured to follower 108 and the shift sleeve of coupler 66. Follower 108 includes a lug 112 formed with an axial hole, through which a guide shaft 114 passes. As drum 100 rotates, follower 108 moves axially between its neutral state and sixth gear and second gear drive states, shaft 114 supports fork 110 and guides its movement axially, and the selector sleeve of coupler 66 is engaged by shift fork 110 and is moved axially between the neutral state and the drive states by movement of the shift fork.

Another follower located in cam channel 88 of actuator drum 84 contacts the lateral surfaces of channel 88, and is guided by the channel for displacement leftward and rightward as drum 84 rotates. A shift fork 116 is secured to that follower and the shift sleeve of coupler 62. A guide shaft 118, located in a lug formed in shift fork 116, supports shift fork 116 and guides it axial movement. As drum 84 rotates, the follower moves axially between the neutral state and the first gear drive state, shaft 118 supports shift fork 116 and guides its movement axially, and the selector sleeve of coupler 62 engages shift fork 116 and is moved axially between the neutral state and the drive states by movement of the shift fork.

In a similar way, coupler 64 is displaced between a neutral state and the third gear and fifth gear drive states, which are located on axially opposite sides of the neutral state, through operation of electro-mechanical actuator 72. Coupler 68 is displaced between a neutral state and the fourth gear and reverse gear drive states, which are located on axially opposite sides of the neutral state, through operation of electro-mechanical actuator 76.

A control algorithm, stored in electronic memory accessible to the controller is repetitively executed and produces control signals that actuate clutches 22, 24 and couplers 62, 64, 66, 68. Motors 76, 92, each rotate clockwise and counterclockwise in response to the polarity and magnitude of electric current signals applied to the motor windings under control of a system controller.

Figure 4:
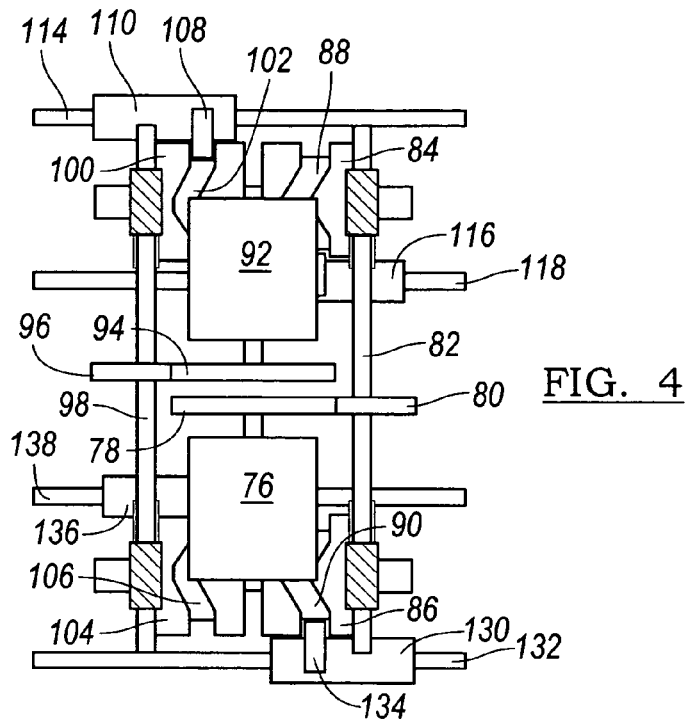
FIG. 4 a schematic diagram of a top view of an actuation system.
Figure 5:
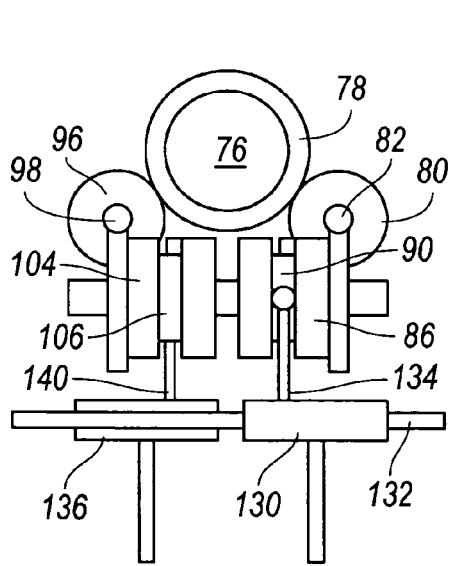
FIG. 5 a schematic diagram of a right side view of the actuation system.
Figure 6:
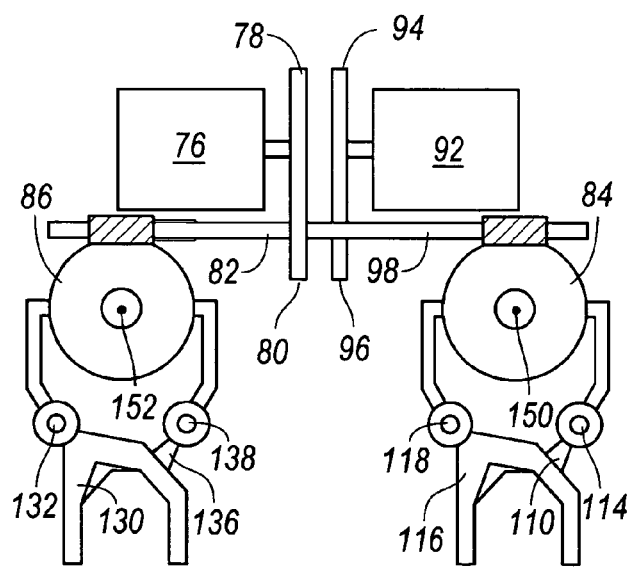
FIG. 6 a schematic diagram of an end view of the actuation system.
Figure 9:
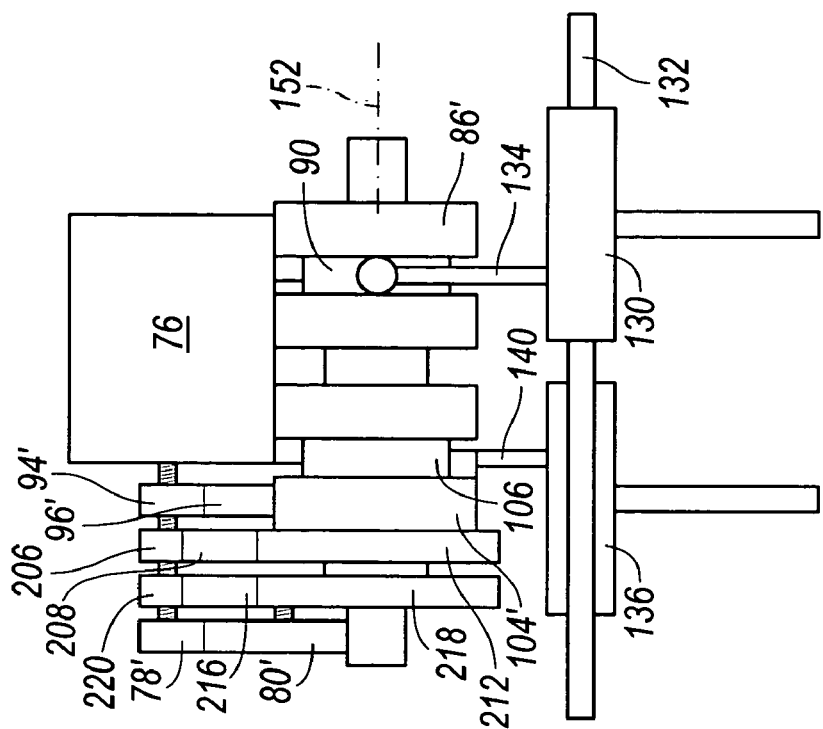
FIG. 9 is a schematic diagram of a right side view of the alternate actuation system of FIG. 8.
Figure 10:
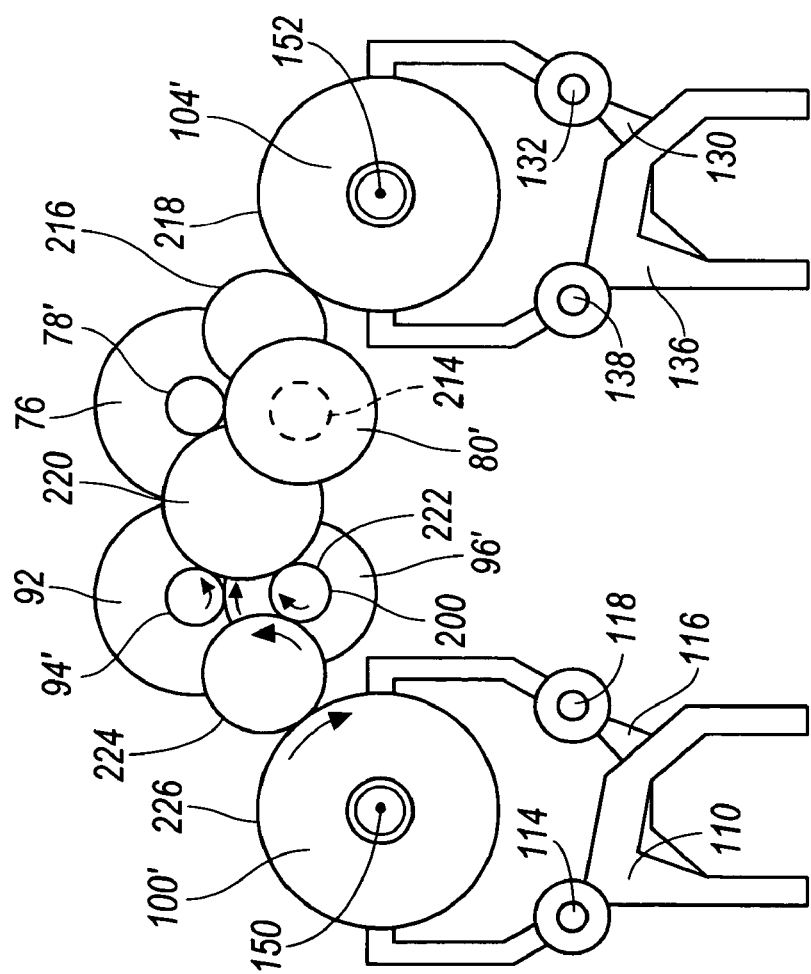
FIG. 10 is a schematic diagram of an end view of the alternate actuation system of FIG. 8.

Referring to FIGS. 4, 5 and 6, the shift fork 130 for actuating the selector sleeve of the 3-5 coupler 64 is supported on shaft 132 for movement along the axis of that shaft. The follower 134 of shift fork 130, located in cam channel 90, follows the cam channel causing shift fork 130 to move on shaft 132 as actuator drum 86 and its cam channel 90 rotate when driven by worm gear 82.

The shift fork 136 for actuating the selector sleeve of the 4-R coupler 68 is supported on shaft 138 for movement along the axis of shaft 138. The follower 140 of shift fork 136, located in cam channel 106, follows the cam channel causing shift fork 136 to move on shaft 138 as actuator drum 104 and its cam channel 106 rotate when driven by worm gear 98. Actuator drums 84 and 100 are supported for rotation about axis 150, and actuator drums 86 and 104 are supported for rotation about axis 152.

FIGS. 7-10 illustrate an alternate actuation system that includes mating pinions and gears, preferably spur or helical gears and pinions, and eliminates the worm gears 82, 98. The system for actuating drum 86' to engage and disengage third and fifth gears includes a pinion 78', which is secured to the shaft of motor 76, and is in meshing engagement with a gear 80', which is secured to a pinion 214 located at the inner lateral side of gear 80'. Pinion 214 is in meshing engagement with an idler gear 216, which meshes with an output gear 218, which is driveably connected by a sleeve shaft 219 to the actuator drum 86' for the third and fifth gears, as FIG. 7 shows.

The system for actuating the drum 84' to engage and disengage first gear includes pinion 78', which is secured to the shaft of motor 76, and is in meshing engagement with gear 80'. Pinion 214, located at the inner lateral side of gear 80', is in meshing engagement with an idler gear 220, which meshes with a gear 222, located at the lateral outer side of gear 96'. Gear 222 is driveably engaged with an idler gear 224, which meshes with an output gear 226, which is driveably connected by a sleeve shaft to the actuator drum 84'.

The system for actuating drum 100' to engage and disengage second and sixth gears includes a pinion 94', which is secured to the shaft of motor 92 and is in meshing engagement with a gear 96'. Pinion 200, which is secured to gear 96' and located at the lateral inner side of gear 96' opposite idler gear 222, is in meshing engagement with an idler gear 202, which meshes with an output gear 204. Output gear 204 is secured to, or driveably connected to actuator drum 100'.

The system for actuating drum 104' to engage and disengage fourth and reverse gears includes pinion 94', which is secured to the shaft of motor 76 and is in meshing engagement with gear 96'. Pinion 200, which is secured to gear 96' and located at the lateral inner side of gear 96' opposite idler gear 222, is in meshing engagement with an idler gear 206, which meshes with a gear 208. Gear 208 is engaged with an idler gear 210, which is engaged with an output gear 212. Output gear 212 is secured to, or driveably connected to actuator drum 104'.

Output gears 226 and 204 are aligned on a common axis. Idler gears 224 and 202 are aligned on a common axis. Gear 222 and the mutually secured pinion 200-gear 96' are aligned on a common axis. Idler gears 220 and 206 are aligned on a common axis. Mutually secured pinion 214-gear 80' and idler gear 208 are aligned on a common axis. Idler gears 216 and 210 are aligned on a common axis. Output gears 218 and 212 are aligned on a common axis.

The power path that actuates second, fourth, sixth and reverse gears is arranged in a first plane, and the power path that actuates first, third and fifth gears is arranged in a second plane substantially parallel to the first plane. The first and second planes are located on the same side of the motors as the location of the motor shafts.

In accordance with the provisions of the patent statutes, the preferred embodiment has been described. However, it should be noted that the alternate embodiments can be practiced otherwise than as specifically illustrated and described.

What is claimed is:

1. An actuation system for producing gear changes in a multiple gear transmission for a motor vehicle comprising:
    a first electric motor including a first motor shaft supported for rotation about a first axis;
    a second electric motor including a second motor shaft supported for rotation;
    first and second actuator drums supported for rotation substantially parallel to the first axis;
    a first drum and a second drum aligned mutually and supported for rotation about a third axis;
    a third drum and a fourth drum aligned mutually and supported for rotation about a fourth axis, the first and fourth drums being associated with odd numbered gears, the second and third drums being associated with even numbered gears and a reverse gear;
    a first drive mechanism including a first power path comprising a first pinion driveably connected to the first motor and located in a first plane, a first gear engaged with the first pinion and located in the first plane, and first layshaft gearing located in a second plane substantially parallel to the first plane and driveably connecting the first gear to the first drum and the fourth drum; and
    a second drive mechanism including a second power path comprising a second pinion driveably connected to the second motor and located in a third plane, a second gear engaged with the second pinion and located in the third plane, and second layshaft gearing located in a fourth plane substantially parallel to the second plane and driveably connecting the second gear to the second drum and the third drum.

2. The actuation system of claim 1 wherein the first power path includes:
    a third pinion driveably connected to the first motor shaft through the first pinion and first gear;
    a first output gear driveably connected to the first drum; and
    a first idler gear driveably connected to the third pinion and first output gear.

3. The actuation system of claim 1 wherein the first power path includes:
    a third pinion driveably connected to the first motor shaft through the first pinion and the first gear;

a first output gear driveably connected to the first drum;
a first idler gear driveably connected to the third pinion and first output gear;
a second output gear driveably connected to the fourth drum;
a second idler gear driveably connected to the third pinion;
a third gear driveably connected to the second idler gear; and
a third idler gear driveably connected to the third gear and the second output gear.

4. The actuation system of claim 1 wherein the second power path includes:
a fourth pinion driveably connected to the second motor shaft through the second pinion and second gear;
a third output gear driveably connected to the third drum;
a fourth idler gear driveably connected to the fourth pinion and the third output gear.

5. The actuation system of claim 1 wherein the first and second pinions, and the first and second gears are spur gears.

6. The actuation system of claim 1 wherein the first power path includes:
a third pinion driveably connected to the first motor shaft through the first pinion and the first gear;
a second output gear driveably connected to the fourth drum;
a second idler gear driveably connected to the third pinion;
third gear driveably connected to the second idler gear; and
a third idler gear driveably connected to the third gear and the second output gear.

7. The actuation system of claim 1 wherein the second power path includes:
a fourth pinion driveably connected to the second motor shaft through the second pinion and the second gear;
a third output gear driveably connected to the third drum;
a fourth idler gear driveably connected to the fourth pinion and the third output gear;
a fourth gear;
a fourth output gear driveably connected to the second drum;
a fifth idler gear driveably connected to the fourth pinion and the fourth gear; and
a sixth idler gear driveably connected to the fourth gear and the fourth output gear.

8. The actuation system of claim 1 wherein the second power path includes:
a fourth pinion driveably connected to the second motor shaft through the second pinion and the second gear;
a fourth gear;
a fourth output gear driveably connected to the fourth drum;
a fifth idler gear driveably connected to the fourth pinion and the fourth gear; and
a sixth idler gear driveably connected to the fourth gear and the fourth output gear.

9. An actuation system for producing gear changes in a multiple gear transmission for a motor vehicle comprising:

a first electric motor including a first motor shaft supported for rotation about a first axis;
first and second actuator drums supported for rotation substantially parallel to the first axis;
a first drive mechanism including:
a first power path comprising a first pinion driveably connected to the first motor shaft and located in a first plane, a first gear engaged with the first pinion and located in the first plane, and first layshaft gearing located in a second plane driveably connecting the first motor shaft and the first drum, and
a second power path comprising layshaft gearing located in the second plane and driveably connecting the first gear and a fourth drum;
a second electric motor including a second motor shaft supported for rotation;
third and fourth actuator drums supported for rotation substantially parallel to the first axis; and
a second drive mechanism including:
a third power path comprising a second pinion driveably connected to the second motor shaft and located in a third plane, a second gear engaged with the second pinion and located in the third plane, and second layshaft gearing located in a fourth plane driveably connected to the second motor shaft and the third drum, and
a fourth power path comprising layshaft gearing located in the fourth plane and driveably connected to the second motor and the second drum.

10. The actuation system of claim 9 wherein:
the first drum is aligned with the second drum;
the third drum is aligned with the fourth drum; and
the second plane is substantially parallel to the first plane.

11. The actuation system of claim 9 wherein the first power path and second power path include pinions, idler gears, and output gears that are spur gears.

12. The actuation system of claim 9 wherein:
the first power path includes a first output gear driveably connected to the first drum, and a first idler gear driveably connected to the first pinion and first output gear;
the second power path includes a second output gear driveably connected to the fourth drum, a second idler gear driveably connected to the first pinion and the first gear, and a third idler gear driveably connected to the second idler gear and the second output gear;
the third power path includes a third output gear driveably connected to the third drum, and a fourth idler gear driveably connected to the second pinion and the third output gear; and
the fourth power path includes a fourth output gear driveably connected to the second drum, a fifth idler gear driveably connected to the second pinion and the second gear; and a sixth idler gear driveably connected to the fifth idler gear and the fourth output gear.

13. The actuation system of claim 9 wherein the second plane is substantially parallel to the fourth plane.

* * * * *